United States Patent
Kim et al.

(10) Patent No.: US 10,419,175 B2
(45) Date of Patent: Sep. 17, 2019

(54) METHOD FOR TRANSMITTING D2D SIGNAL IN WIRELESS COMMUNICATION SYSTEM AND DEVICE THEREFOR

(71) Applicant: LG ELECTRONICS INC., Seoul (KR)

(72) Inventors: Youngtae Kim, Seoul (KR); Hanbyul Seo, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 241 days.

(21) Appl. No.: 15/127,764

(22) PCT Filed: Mar. 20, 2015

(86) PCT No.: PCT/KR2015/002737
§ 371 (c)(1),
(2) Date: Sep. 20, 2016

(87) PCT Pub. No.: WO2015/142110
PCT Pub. Date: Sep. 24, 2015

(65) Prior Publication Data
US 2018/0175982 A1 Jun. 21, 2018

Related U.S. Application Data

(60) Provisional application No. 61/968,346, filed on Mar. 20, 2014.

(51) Int. Cl.
*H04L 5/00* (2006.01)
*H04W 16/10* (2009.01)
*H04W 76/14* (2018.01)

(52) U.S. Cl.
CPC .......... *H04L 5/0048* (2013.01); *H04L 5/0037* (2013.01); *H04L 5/0044* (2013.01);
(Continued)

(58) Field of Classification Search
CPC ... H04L 5/0048; H04L 5/0082; H04L 5/0037; H04W 16/10
See application file for complete search history.

(56) References Cited

U.S. PATENT DOCUMENTS 9,826,494 B2 * 11/2017 Chen ..................... H04W 76/10
2011/0244877 A1 10/2011 Farajidana et al.
(Continued)

FOREIGN PATENT DOCUMENTS

WO 2013062310 5/2013

OTHER PUBLICATIONS

Samsung, "Utilization of resource pools," 3GPP TSG-RAN WG2 #85, R2-140229, Feb. 2014, 3 pages.
(Continued)

*Primary Examiner* — Omer S Mian
(74) *Attorney, Agent, or Firm* — Lee Hong Degerman Kang Waimey

(57) ABSTRACT

The present disclosure describes a method and device for transmitting a device to device (D2D) signal by a first terminal in a wireless communication system. More particularly, the method comprises transmitting a D2D signal using at least one first resource unit corresponding to a first orthogonal resource pattern and at least one second resource unit corresponding to a second orthogonal resource pattern on a resource area, wherein the first orthogonal resource pattern is defined by at least one first resource unit number defined through a first axis-priority mapping and the second orthogonal resource pattern is defined by at least one second resource unit number defined through a second axis-priority mapping, and the at least one first resource unit and the at least one second resource unit are configured to overlap each other by a predetermined number or less of the resource units.

5 Claims, 11 Drawing Sheets

(52) U.S. Cl.
CPC .......... *H04L 5/0082* (2013.01); *H04W 16/10* (2013.01); *H04W 76/14* (2018.02)

(56) References Cited

U.S. PATENT DOCUMENTS

2014/0370904 A1* 12/2014 Smith .................. H04W 8/005
455/450
2015/0319738 A1* 11/2015 Fodor .................. H04W 24/10
370/330
2017/0048856 A1* 2/2017 Sorrentino ............. H04B 1/713

OTHER PUBLICATIONS

LG Electronics, "Resource Allocation and Interference Coordination in D2D Communications," 3GPP TSG-RAN WG1 #74bis, R1-134412, Sep. 2013, 13 pages.
Intel Corporation, "Discussion on Resource Allocation Methods for D2D Communication," 3GPP TSG-RAN WG1 #74bis, R1-134139, Sep. 2013, 10 pages.
PCT International Application No. PCT/KR2015/002737, Written Opinion of the International Searching Authority dated Jun. 10, 2015, 16 pages.

\* cited by examiner (a) Control-plane protocol stack (b) User-plane protocol stack D2D signal transmission from a UE allocated with unit #0

METHOD FOR TRANSMITTING D2D SIGNAL IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2015/002737, filed on Mar. 20, 2015, which claims the benefit of U.S. Provisional Application No. 61/968,346, filed on Mar. 20, 2014, the contents of which are all hereby incorporated by reference herein in their entirety.

TECHNICAL FIELD

The present invention relates to a wireless communication system and, more specifically, to a method of transmitting a D2D signal in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

UEs report current channel state information to an eNB periodically and/or aperiodically in order to assist efficient operation of a wireless communication system of the eNB. Since the reported channel state information may include results calculated in consideration of various situations, a more efficient reporting method is needed.

DISCLOSURE

Technical Problem

An object of the present invention devised to solve the problem lies in a method of transmitting a D2D signal in a wireless communication system and a device therefor.

The technical problems solved by the present invention are not limited to the above technical problems and those skilled in the art may understand other technical problems from the following description.

Technical Solution

In an aspect of the present invention, a method of transmitting a device-to-device (D2D) signal by a first UE in a wireless communication system includes: setting a first orthogonal resource pattern and a second orthogonal resource pattern; and transmitting a D2D signal using at least one first resource unit corresponding to the first orthogonal resource pattern and at least one second resource unit corresponding to the second orthogonal resource pattern in a resource region, wherein the first orthogonal resource pattern is defined by at least one first resource unit number defined through first axis-priority mapping and the second orthogonal resource pattern is defined by at least one second resource unit number defined through second axis-priority mapping, and the at least one first resource unit and the at least one second resource unit are configured to overlap each other by a predetermined number of resource units or less.

The first axis and the second axis may be defined as one of a frequency axis and a time axis, wherein the first axis and the second axis are set to different axes.

The at least one second resource unit may be repeatedly allocated by the number of the at least one second resource unit in the resource region and cyclically shifted on the time axis on the basis of the number of the at least one first resource unit. The at least one second resource unit may be reconfigured to be consecutively allocated along the frequency axis.

The D2D signal may be transmitted using a radio resource other than overlapping resource units from among the at least one first resource unit and the at least one second resource unit.

A sequence of a demodulation reference signal (DM-RS) of the first UE may be generated on the basis of the first orthogonal resource pattern and the second orthogonal resource pattern.

A scrambling sequence of data of the first UE may be generated on the basis of the first orthogonal resource pattern and the second orthogonal resource pattern.

A sequence of a DM-RS of the first UE may be generated on the basis of a predetermined number of repetitions of the first orthogonal resource pattern and the second orthogonal resource pattern.

In another aspect of the present invention, a first UE for transmitting a D2D signal in a wireless communication system includes: a radio frequency (RF) unit; and processor, wherein the processor is configured to set a first orthogonal resource pattern and a second orthogonal resource pattern and to transmit a D2D signal using at least one first resource unit corresponding to the first orthogonal resource pattern and at least one second resource unit corresponding to the second orthogonal resource pattern in a resource region, wherein the first orthogonal resource pattern is defined by at least one first resource unit number defined through first axis-priority mapping and the second orthogonal resource pattern is defined by at least one second resource unit number defined through second axis-priority mapping, and the at least one first resource unit and the at least one second resource unit are configured to overlap each other by a predetermined number of resource units or less.

Advantageous Effects

According to embodiments of the present invention, a D2D signal can be efficiently transmitted in a wireless communication system.

Effects obtainable from the present invention are non-limited by the above mentioned effect. And, other unmentioned effects can be clearly understood from the following description by those having ordinary skill in the technical field to which the present invention pertains

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE

In the following description, compositions of the present invention, effects and other characteristics of the present invention can be easily understood by the embodiments of the present invention explained with reference to the accompanying drawings. Embodiments explained in the following description are examples of the technological features of the present invention applied to a 3GPP system.

In the specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

Figure 1:
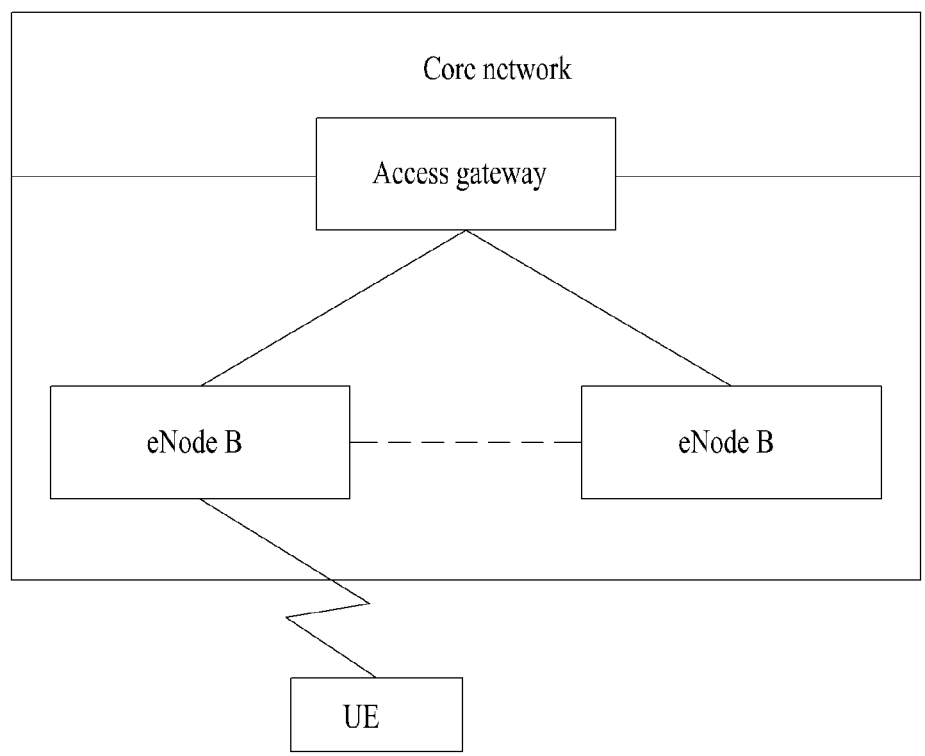
FIG. 1 is a diagram showing a network structure of an Evolved Universal Mobile Telecommunications System (E-UMTS) as an example of a wireless communication system.
Figure 2:
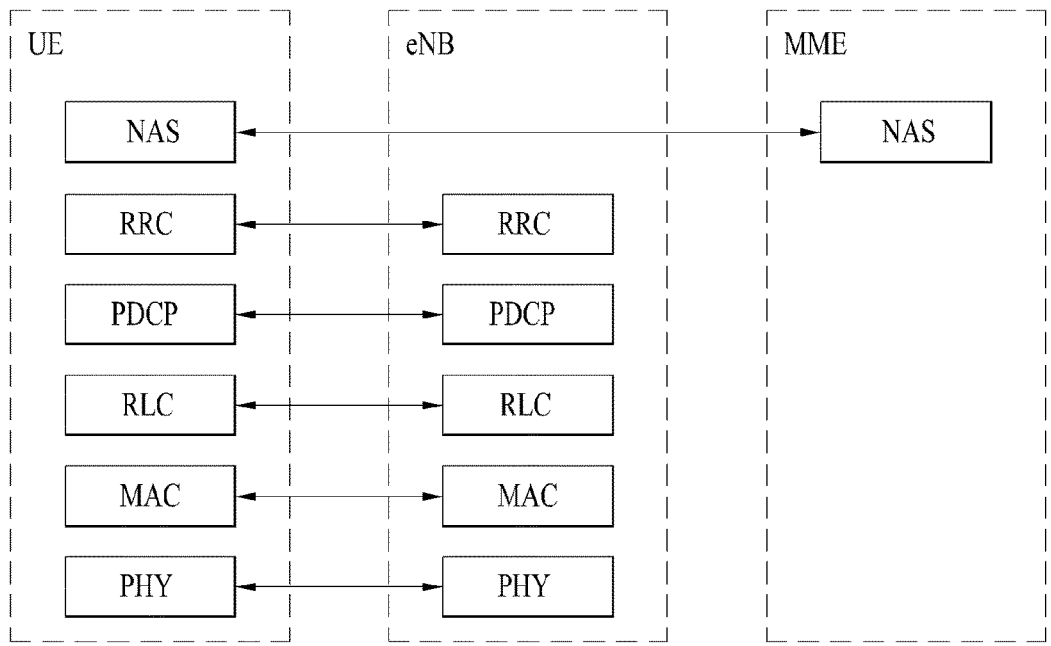
FIG. 2 is a diagram showing a control plane and a user plane of a radio interface protocol between a UE and an E-UTRAN based on a 3rd generation partnership project (3GPP) radio access network standard.
Figure 2:
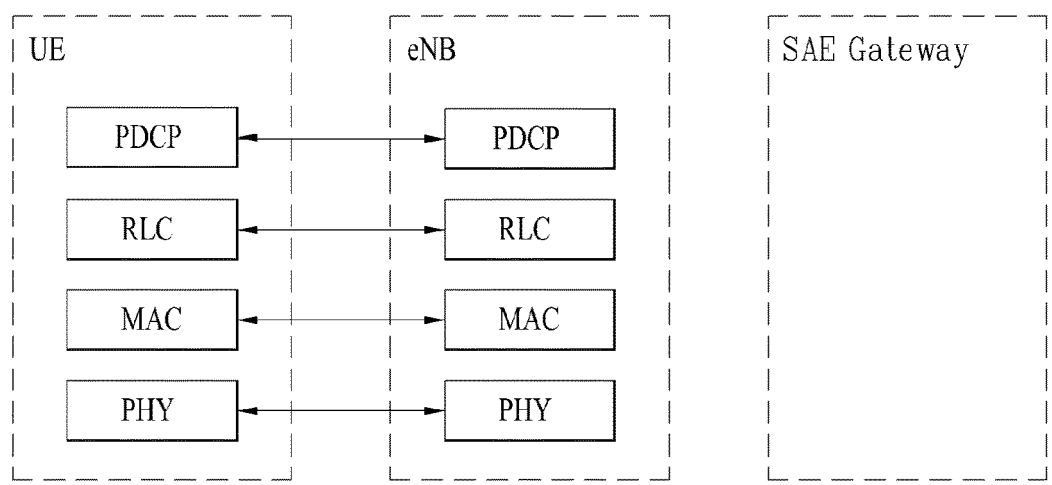

FIG. 2 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.4, 3, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
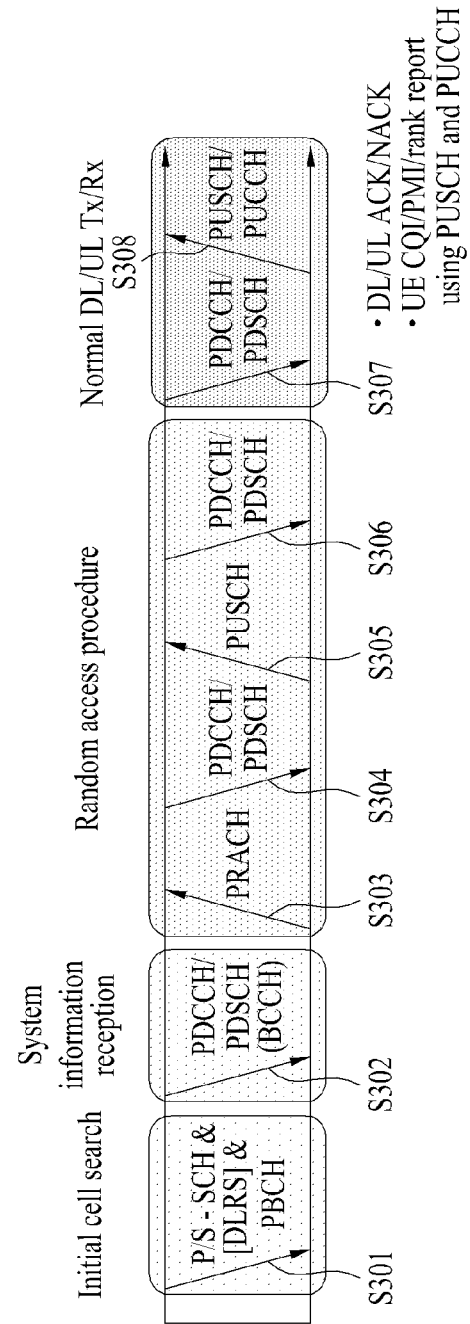
FIG. 3 is a diagram illustrating physical channels used in a 3GPP system and a general signal transmitting method using the same.

FIG. 3 is a diagram illustrating physical channels used in a 3GPP system and a general signal transmitting method using the same.

If a UE is powered on or newly enters a cell, the UE performs an initial cell search operation such as synchronization with a base station (S301). The UE receives a primary synchronization channel (P-SCH) and a secondary synchronization channel (S-SCH) from the base station so as to synchronize with the base station and to acquire information such as a cell ID. Thereafter, the UE may receive a physical broadcast channel from the base station so as to acquire a broadcast signal in the cell. The UE may receive a downlink reference signal (DL RS) so as to check a downlink channel state in the initial cell search step.

The UE, upon completion of initial cell search, may receive a Physical Downlink Control Channel (PDCCH) and a Physical Downlink Shared Channel (PDSCH) according to information carried in the PDCCH so as to acquire more detailed system information (S302).

When the UE initially accesses the base station or when radio resources for signal transmission are not present, the UE may perform a Random Access Procedure (RACH) with respect to the base station (steps S303 to S306). The UE may transmit a specific sequence using a preamble through a Physical Random Access Channel (PRACH) (S303) and receive a response message of the preamble through the PDCCH and the PDSCH corresponding thereto (S304). In the contention-based RACH a contention resolution procedure, such as a transmission of the PRACH (S305) and a reception of the PDCCH and the PDSCH corresponding thereto (S306), may be additionally performed.

The UE which performs the above-described procedure may receive the PDCCH/PDSCH (S307) and transmit a Physical Uplink Shared Channel (PUSCH)/Physical Uplink Control Channel (PUCCH) (S308), as a general uplink/downlink signal transmission procedure. Specifically, the UE receives downlink control information (DCI) through the PDCCH. Here, the DCI includes control information such as resource allocation information for the UE, and has a different format depending on the use thereof.

Meanwhile, the information transmitted from the UE to the base station in uplink and transmitted from the base station to the UE may include a downlink/uplink ACK/NACK signal, a Channel Quality Indicator (CQI), a Precoding Matrix Index (PMI), a Rank Indicator (RI), etc. In the 3GPP LTE system, the UE may transmit the above-described information such as CQI/PMI/RI through the PUSCH and/or the PUCCH.

Figure 4:
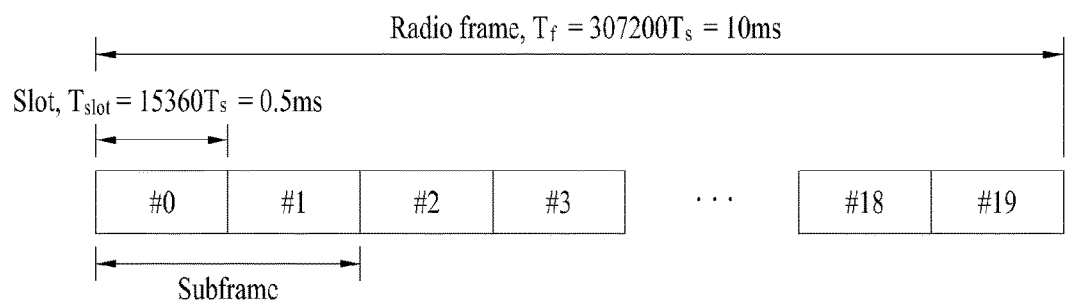
FIG. 4 illustrates exemplary radio frame structures in a LTE system.

FIG. 4 illustrates exemplary radio frame structures in a LTE system.

Referring to FIG. 4, a radio frame is 10 ms (307200 $T_s$) and divided into 10 equal-sized subframes. The 10 subframes of a radio frame may be indexed. Herein, $T_s$ represents a sampling time and $T_s=1/(2048*15 \text{ kHz})$ (approximately, 33 ns). Each subframe is 1 ms long, including two slots. Each slot is 0.5 ms (15360 $T_s$) long. A slot includes a plurality of orthogonal frequency division multiplexing (OFDM) symbols in the time domain and a plurality of resource blocks (RBs) in the frequency time. In a LTE system, single resource block includes 12 (subcarriers)*7 (or 6) OFDM symbols. TTI (Transmission Time Interval), which is unit time for data transfer, can be defined by one or more subframes. The aforementioned structure of the radio frame is shown for exemplary purposes only. Thus, the number of subframes included in the radio frame or the number of slots included in the subframe or the number of OFDM symbols included in the slot may be modified in various manners.

Figure 5:
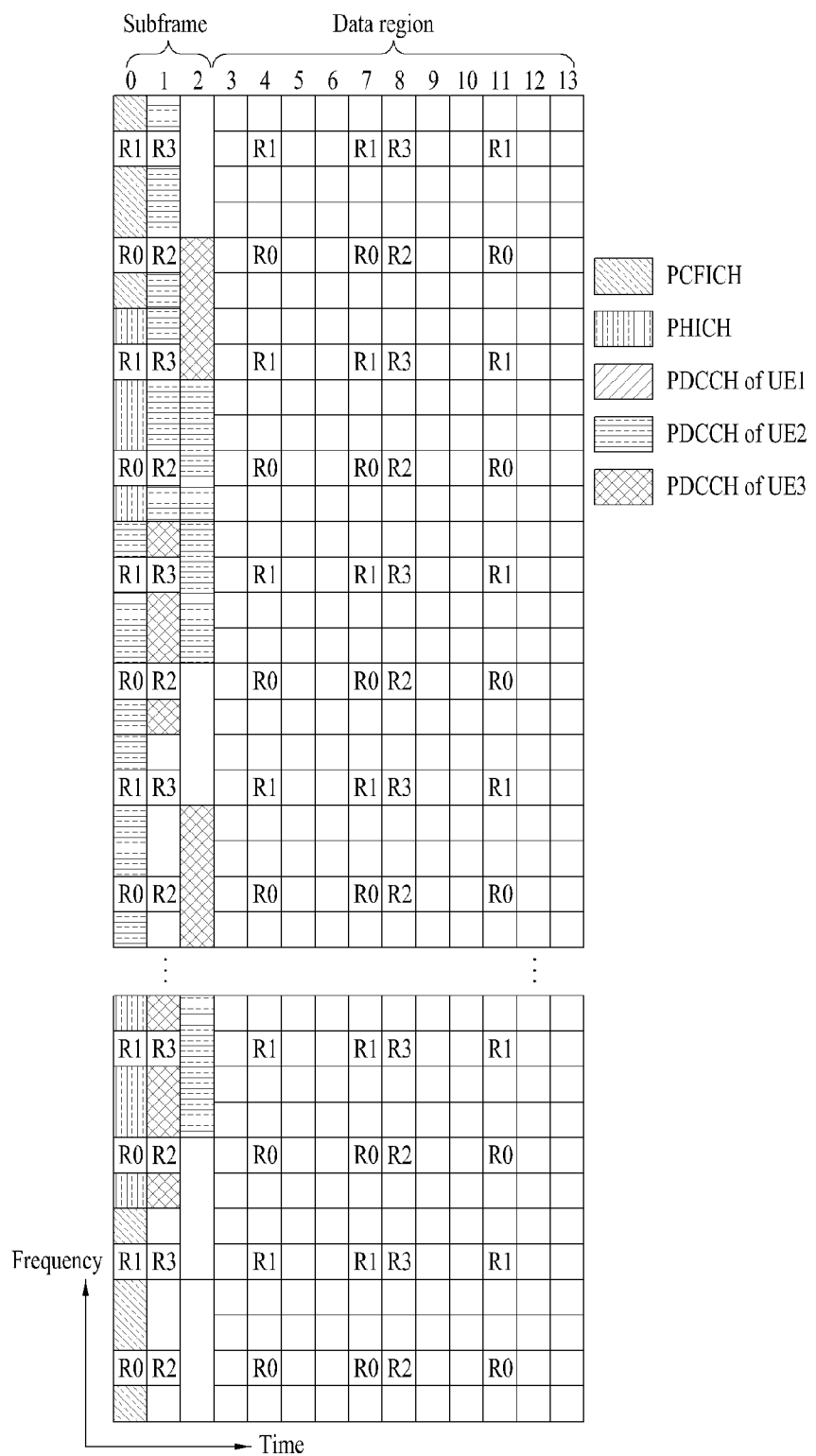
FIG. 5 illustrates an example of a downlink subframe structure.

FIG. 5 illustrates control channels included in a control region of one subframe in a downlink radio frame.

Referring to FIG. 5, the subframe consists of 14 OFDM symbols. Initial 1 to 3 OFDM symbols are used as the control region and the other 13 to 11 OFDM symbols are used as a data region depending on a subframe configuration. In this figure, R1 to R4 denote reference signals (RSs) (or pilot signals) for antennas 0 to 3. The RSs are fixed as a certain pattern in the subframe irrespective of the control region and the data region. The control channels are allocated to resources of the control region to which no RS is allocated, and traffic channels are allocated to resources of the data region to which no RS is allocated. The control channels allocated to the control region include a Physical Control Format Indicator Channel (PCFICH), a Physical HARQ (Hybrid-Automatic Repeat and Request) Indicator Channel (PHICH), a Physical Downlink Control Channel (PDCCH), etc.

The PCFICH signals the number of OFDM symbols used for the PDCCH in every subframe to the UE. The PCFICH is located in the first OFDM symbol and is configured prior to the PHICH and the PDCCH. The PCFICH consists of 4 resource element groups (REGs) each distributed over the control region based on cell identity (ID). One REG consists of 4 resource elements (REs). The RE refers to a minimum physical resource defined as one subcarrier×one OFDM symbol. The value of the PCFICH indicates one of values 1 to 3 or 2 to 4 depending on a bandwidth and is modulated through quadrature phase shift keying (QPSK).

The PHICH is used to carry HARQ ACK/NACK for uplink transmission. That is, the PHICH refers to a channel for transmitting DL ACK/NACK information for UL HARQ. The PHICH consists of 1 REG, and is scrambled cell-specifically. ACK/NACK is indicated using 1 bit, and is modulated through binary phase shift keying (BPSK). The modulated ACK/NACK is spread using a spreading factor (SF)=2 or 4. A plurality of PHICH channels mapped to the same resource form a PHICH group. The number of PHICH channels multiplexed into the PHICH group is determined depending on the number of spreading codes. The PHICH (group) is repeated 3 times to achieve diversity gain in the frequency domain and/or the time domain.

The PDCCH is allocated to initial n OFDM symbols of the subframe. Here, n is an integer equal to or greater than 1 and is indicated by the PCFICH. The PDCCH consists of one or more CCEs. The PDCCH signals information related to resource allocation of a Paging Channel (PCH) and a Downlink-Shared Channel (DL-SCH) which are transmission channels, uplink scheduling grant, HARQ information, etc. to each UE or UE group. The PCH and the DL-SCH are transmitted through a PDSCH. Accordingly, the base station and the UE generally transmit and receive data other than specific control information or specific service data through the PDSCH.

Information about a UE (or UEs) targeted by the data of the PDSCH, information about schemes for receiving and decoding the PDSCH data by the UEs, etc. are carried by the PDCCH. For example, it is assumed that a specific PDCCH is CRC-masked with radio network temporary identity (RNTI) "A" and information about data to be transmitted using radio resource (e.g., frequency location) "B" and DCI format (i.e., transmission format information (e.g., transmission block size, modulation scheme, coding information, etc.)) "C" is transmitted in a specific subframe. In this case, a UE within a cell monitors, i.e., blind-decodes, the PDCCH in a search area using RNTI information of the UE. If one or more UEs have RNTI "A", the UEs receive the PDCCH, and receive a PDSCH indicated by "B" and "C" using information of the received PDCCH.

Figure 6:
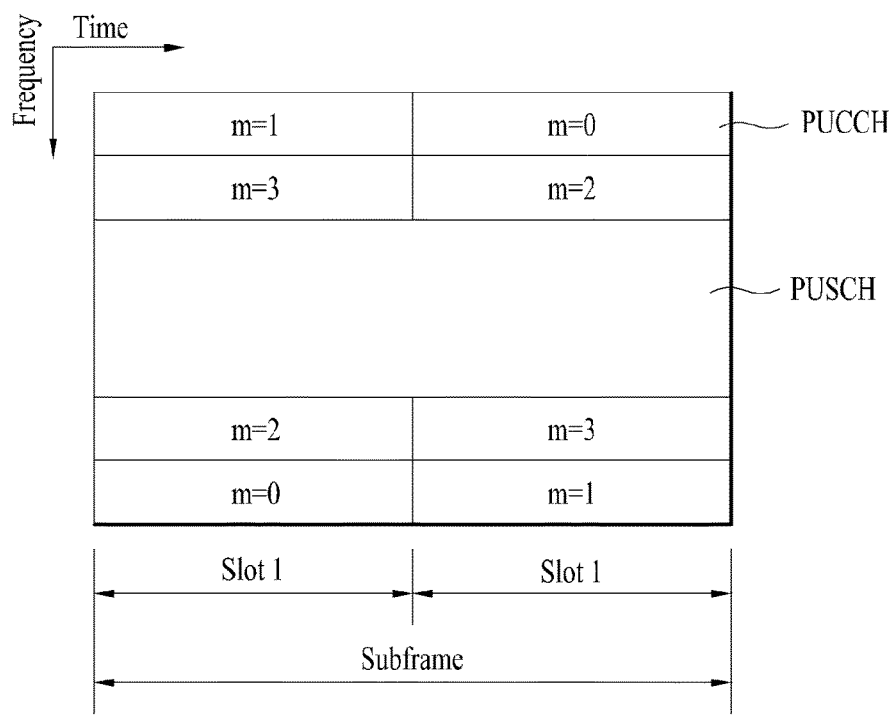
FIG. 6 is a diagram showing a structure of an uplink subframe used in LTE.

FIG. 6 illustrates the structure of a UL subframe in a LTE system.

Referring to FIG. 6, the UL subframe can be divided into a region to which Physical Uplink Control Channels (PUCCHs) carrying control information are allocated, and a region to which Physical Uplink Shared Channels (PUSCHs) carrying user data are allocated. A middle part of the subframe is allocated for the PUSCHs, and two side parts of the data region in the frequency domain are allocated for the PUCCHs. The control information carried by the PUCCH includes ACK/NACK used for HARQ, a channel quality indicator (CQI) indicating DL channel state, a rank indicator (RI) for MIMO, a scheduling request (SR) which is a UL resource allocation request, etc. The PUCCH for one UE uses one resource block which occupies different frequencies in slots of the subframe. That is, 2 resource blocks allocated for the PUCCH are frequency hopped at a slot boundary. Specifically, FIG. 6 exemplarily shows that a PUCCH of m=0, a PUCCH of m=1, a PUCCH of m=2, and a PUCCH of m=3 are allocated to the subframe.

A description is now given of a MIMO system. Multiple-Input Multiple-Output (MIMO) is a method using multiple Tx antennas and multiple Rx antennas, and this method may improve transmission and reception efficiency of data. That is, a transmitter or receiver of a wireless communication system uses multiple antennas and thus the capacity and performance thereof may be improved. In the following description of the present invention, MIMO can be called 'multiple antenna technology'.

In the multiple antenna technology, reception of one whole message does not depend on a single antenna path. Instead, in the multiple antenna technology, data fragments received through multiple antennas are collected and combined to complete data. If the multiple antenna technology is used, a data transfer rate within a cell region of a specific size may be improved, or system coverage may be improved while ensuring a specific data transfer rate. In addition, this technology can be broadly used by mobile communication devices and relays. Due to the multiple antenna technology, restriction on mobile communication traffic based on a legacy technology using a single antenna can be solved.

Figure 7:
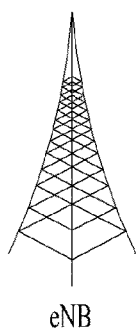
FIG. 7 illustrates D2D communication.
Figure 7:
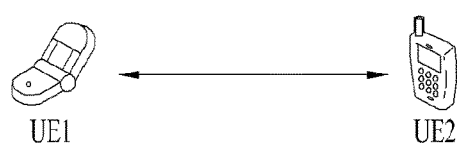

FIG. 7 illustrates D2D communication to which the present invention is applied.

In FIG. 7, data exchange between a first UE UE1 and a second UE UE2 may be performed without an eNB. Such a link directly established between devices may be called a D2D link. D2D communication has advantages that latency is reduced and fewer radio resources are required, compared to legacy eNB-oriented communication.

Although D2D communication supports device-to-device (or UE-to-UE) communication without an eNB, D2D communication needs to cause no interference or disturbance in legacy wireless communication systems (e.g., 3GPP LTE/LTE-A) because D2D communication reuses resources of the legacy wireless communication systems. Furthermore, it is also important to minimize interference applied to D2D communication by a UE, an eNB and the like operating in the legacy wireless communication systems.

While a UE refers to a UE of a user in FIG. 7, when a network device such as an eNB transmits/receives signals according to a communication scheme between UEs, the eNB is regarded as a UE and the present invention is applicable thereto.

In the following, UE1 may select a resource unit corresponding to a specific resource within a resource pool that refers to a resource set and transmit a D2D signal using the resource unit. UE2 corresponding to a reception UE is configured with a resource pool in which UE1 can transmit a signal and detects the signal of UE1 within the configured resource pool. Here, the resource pool may be signaled by an eNB when UE1 is within the coverage of the eNB. When UE1 is located outside the coverage of the eNB, the resource pool may be signaled by another UE or determined as predetermined resources.

Figure 8:
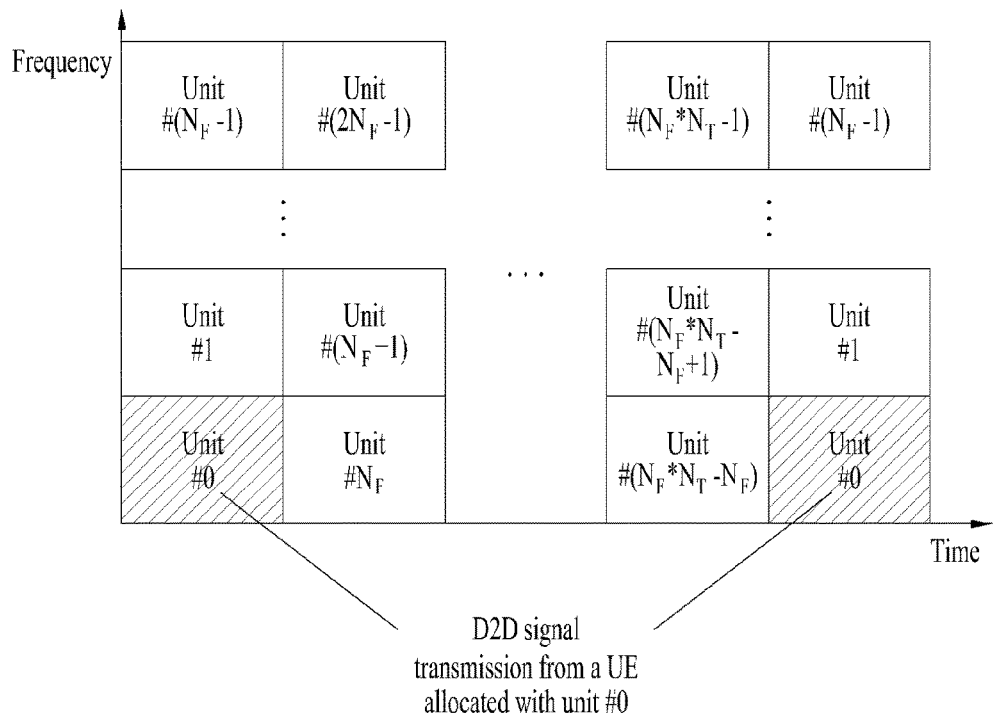
FIG. 8 illustrates a resource pool to which the present invention is applicable.

A resource pool to which the present invention is applicable will now be described with reference to FIG. 8. The resource pool is composed of a plurality of resource units, and each UE may select one or more resource units and use the selected resource units to transmit a D2D signal thereof. FIG. 8 illustrates a case in which frequency resources are divided into $N_F$ and time resources are divided into $N_T$ to define a total of $N_F*N_T$ resource units.

In FIG. 8, the resource pool may be considered to be repeated at an interval of $N_T$ subframes. One resource unit may periodically appear, as illustrated in FIG. 8. Otherwise, to obtain diversity in the time or frequency domain, an index of a physical resource unit to which one logical resource unit is mapped may vary with time in a predetermined pattern. In this resource unit structure, a resource pool may refer to a set of resource units used by a UE to transmit a D2D signal.

Furthermore, resource pools may be classified as various types. That is, resource pools may be classified according to contents of D2D signals transmitted therein. For example, contents of D2D signals may be divided as follows and different resource pools may be set for respective D2D signal contents.

SA (Scheduling Assignment): refers to a signal including information such as the position of a resource used by each transmission UE for a D2D data channel to be transmitted, a modulation and coding scheme (MCS) required for demodulation of the D2D data channel and a MIMO transmission scheme. SA may be multiplexed with D2D data and transmitted on the same resource unit. In this case, an SA resource pool may refer to a resource pool in which SA is multiplexed with D2D data and transmitted.

D2D data channel: refers to a resource pool used for a transmission UE to transmit user data using a resource designated through SA. If SA is multiplexed with D2D data and transmitted on the same resource unit, only D2D data channels other than SA information may be transmitted in a resource pool for D2D data channels. In other words, a resource element (RE), which was used to carry SA information on an individual resource unit in a SA resource pool, may be used to transmit D2D data in a D2D data channel resource pool.

Discovery message: refers to a resource pool for a message through which a transmission UE sends information such as the ID thereof such that a neighbor UE can discover the transmission UE.

That is, even when D2D signals have the same contents (SA, D2D data channels and discovery messages), different resource pools may be used according to transmission/reception properties of the D2D signals. For example, even identical D2D data channels or discovery messages may be assigned different resource pools according to i) D2D signal transmission timing determination scheme (e.g., whether a D2D signal is transmitted at a synchronization reference signal reception timing or transmitted in a specific timing advance (TA) of the synchronization reference signal reception timing), ii) a resource allocation scheme (e.g., whether an eNB designates an individual signal transmission resource for an individual transmission UE or the individual transmission UE arbitrarily selects the individual signal transmission resource within a resource pool) or iii) a signal format (e.g., the number of symbols occupied by each D2D signal in one subframe or the number of subframes used for transmission of one D2D signal).

Based on the aforementioned description, a UE that intends to transmit data through D2D (i.e., transmission UE) selects an appropriate resource in an SA pool and transmits SA thereof through the selected resource. Here, an SA resource associated with a resource, which satisfies at least one of i) resources in which SA transmission of other UEs is not performed and ii) resources expected to have no data transmission in the following subframes according to SA of other UEs, may be preferentially selected. Additionally, the transmission UE may select an SA resource associated with a data transmission resource expected to have a low interference level.

An SA resource pool precedes a D2D data channel resource pool, in general. A reception UE attempts to detect SA and, upon detection of presence of data that needs to be received thereby, receives the data in a D2D data channel resource associated with the detected SA.

Figure 9:
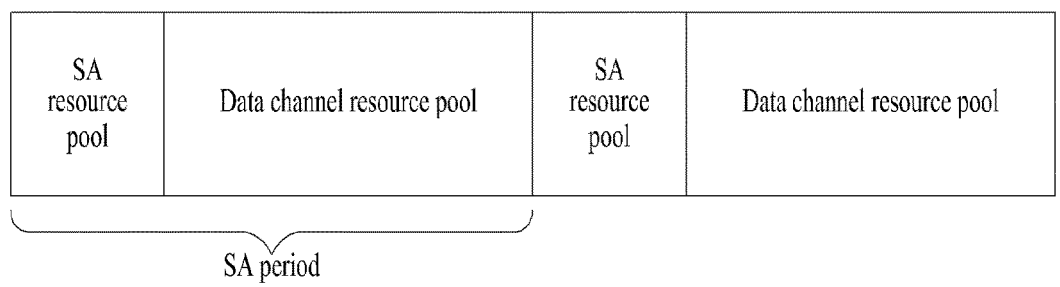
FIG. 9 illustrates a case in which an SA resource pool and a data channel resource pool periodically appear.

FIG. 9 illustrates a case in which an SA resource pool and a D2D data channel resource pool periodically appear. It is assumed that the SA resource pool precedes the data channel resource pool in the present invention. In the following, a period in which the SA resource pool appears is defined as an SA period, as shown in FIG. 9.

In addition, a set of one or more resource units, designated in the SA resource pool and used for a transmission UE to transmit data, is referred to as a resource region for convenience of description of the present invention. Such resource region may be distributed and allocated to a plurality of resource units within a data channel resource pool in one SA period.

Figure 10:
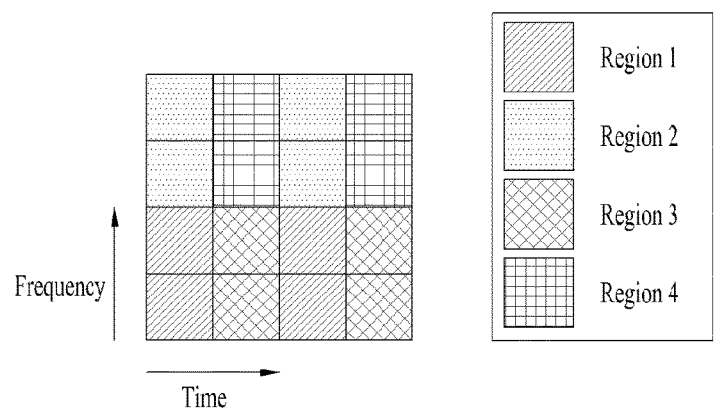
FIG. 10 illustrates a data channel resource pool including 16 resource units in one period.

FIG. 10 illustrates a data channel resource pool composed of 16 resource units in one SA period. While FIG. 10 illustrates a case in which the data channel resource pool includes 4 resource regions for convenience of description, the present invention is not limited thereto.

In D2D, an eNB may have difficulty controlling all transmission UEs (e.g., resource scheduling) all the time, and thus a plurality of transmission UEs may perform scheduling for the same resource region in an SA pool. Accordingly, data of the transmission UEs may interfere with each other in the resource region simultaneously scheduled by the transmission UEs. Furthermore, a plurality of UEs that perform scheduling in the same resource region has difficulty determining whether interference is applied to the resource region due to half duplex.

Figure 11:
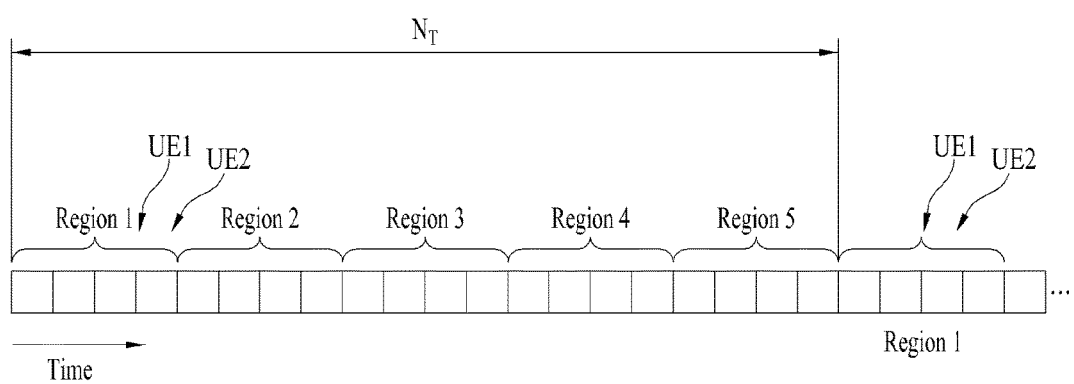
FIG. 11 illustrates a data channel resource pool having one frequency unit and 16 time units in one period.

FIG. 11 illustrates a data channel resource pool having one frequency unit and 20 time units in one period. A description will be given of a case in which a plurality of UEs using the same resource region has difficulty determining whether interference is applied to the resource region due to half duplex with reference to FIG. 11.

Referring to FIG. 11, UE1 and UE2 designate 4 resource units corresponding to resource region 1 in an SA pool and then transmit data. Here, if UE1 and UE2 operate according to half duplex in which transmission and reception cannot be simultaneously performed, UE1 and UE2 interfere with each other but cannot recognize collision of data that generates such interference. Furthermore, a problem that UE1 and UE2 simultaneously designate resource region 1 even in an SA pool after collision may be generated. If collision of data transmitted from UE1 or UE2 is detected, an attempt to prevent collision in transmission after the collision may be made.

Accordingly, the present invention provides a method of designing some resource units forming resource patterns such that the resource units overlap in order to solve a problem that interference is generated for each resource unit included in a resource pattern when transmission UEs use identical resource patterns, as described above.

According to the present invention, many resource patterns can be designed in a data channel resource pool of one period and thus the probability of designating the same resource pattern is reduced. Since some resource units may overlap between resource patterns, interference may be applied to some resource units even if transmission UEs select different resource patterns. However, the probability that interference corresponding to the total number of resource units of a resource pattern is generated decreases although the probability that some resource units suffer interference increases. Therefore, according to the present invention, system performance can be improved by preventing the worst case in which interference is generated in all resource units of a resource pattern. Furthermore, the present invention can recognize a degree of current collision of half-duplex transmission UEs.

Figure 12:
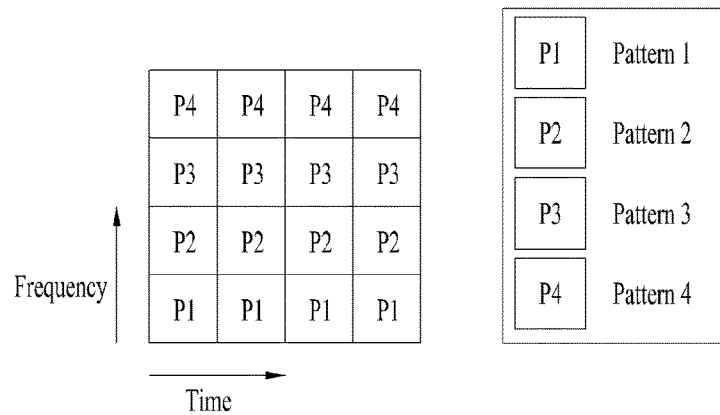
FIG. 12 is a reference diagram illustrating an orthogonal resource pattern according to one embodiment of the present invention.

FIG. 12 illustrates an example of an orthogonal pattern type for describing the present invention. That is, an orthogonal pattern type in which there is no resource unit interference between resource patterns is defined in FIG. 12. In addition, resource patterns may be designed to overlap by grouping two or more different orthogonal pattern types and using the same in a data channel resource pool of one period. The present invention designs a maximum of two orthogonal pattern types (OPTs) to be used in the data channel resource pool of one period. The two OPTs are referred to as OPT1 and OPT2, resource patterns in OPT1 are referred to as P1, P2, P3, . . . and resource patterns in OPT2 are referred to as S1, S2, S3, . . . for convenience of description.

For superposition pattern type, the present invention may apply the following settings A-1 to A-3.

A-1: A maximum number of OPTs used in the data channel resource pool of one period is N. Here, the maximum number of OPTs may be determined according to UE ID or through signaling of an eNB.

A-2: A pattern Pi in OPT1 may overlap with a plurality of patterns Si in OPT2. Here, the pattern Pi and patterns Si overlap by a maximum of $N_2$ resource units. In addition, a pattern Si in OPT2 may overlap with a plurality of patterns Qi in OPT3. Here, the pattern Si and patterns Q1 overlap by a maximum of $N_2$ resource units. A pattern Pi in OPT1 may overlap with a plurality of patterns Qi in OPT3. Here, the pattern Pi and patterns Qi overlap by a maximum of $N_2$ resource units.

A-3: In a pair of overlapping Pi and Si, at least one resource unit other than resource units overlapping in Pi uses time resources other than time resources of resource units used for Si. At least one resource unit other than resource units overlapping in Si uses time resources other than time resources of resource units used for Pi. Frequency resources are irrelevant. In the case of a pair of overlapping Si and Qi, at least one resource unit other than resource units overlapping in Si uses time resources other than time resources of resource units used for Qi. At least one resource unit other than resource units overlapping in Qi uses time resources other than time resources of resource units used for Si. Frequency resources are irrelevant. Similarly, in the case of a pair of overlapping Pi and Qi, at least one resource unit other than resource units overlapping in Pi uses time resources other than time resources of resource units used for Qi. At least one resource unit other than resource units overlapping in Qi uses time resources other than time resources of resource units used for Pi. Frequency resources are irrelevant Setting A-1 is described in detail. With reference to one resource unit, only a maximum of N patterns can be configured for superposition. This is because reliability cannot be secured if too many patterns overlap (on one resource unit).

Setting A-2 is described in detail. Only a maximum of $N_2$ resource units may be set for superposition with respect to 2 selected patterns.

In setting A-3, with respect to one specific pattern, all patterns currently used (in a resource region) are estimated in time resources other than time resources corresponding to the specific pattern. This is for the purpose of performing only transmission in a time for which a half-duplex transmission UE transmits data and estimating currently used patterns in a reception mode in other time periods.

Figure 13:
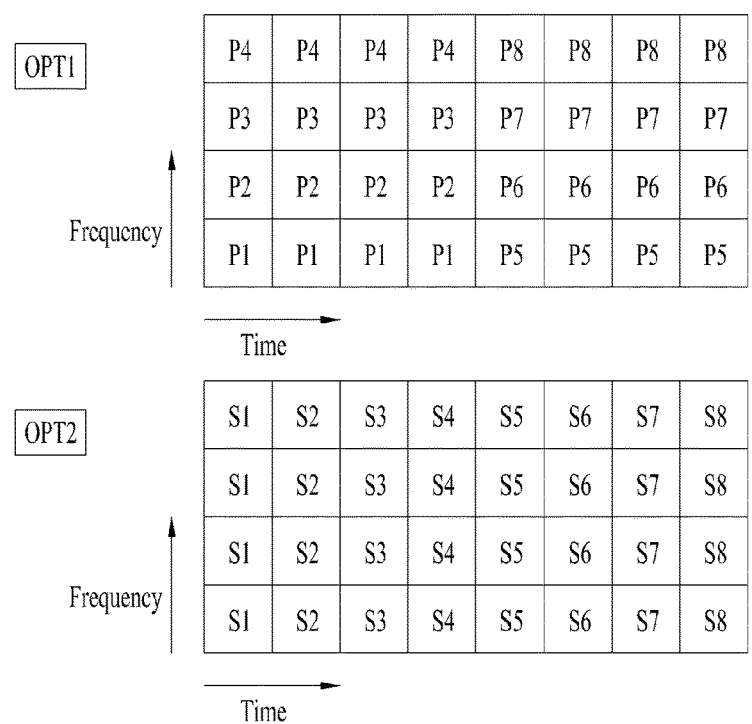
FIGS. 13 to 15 are reference diagrams illustrating one embodiment of the present invention.
Figure 14:
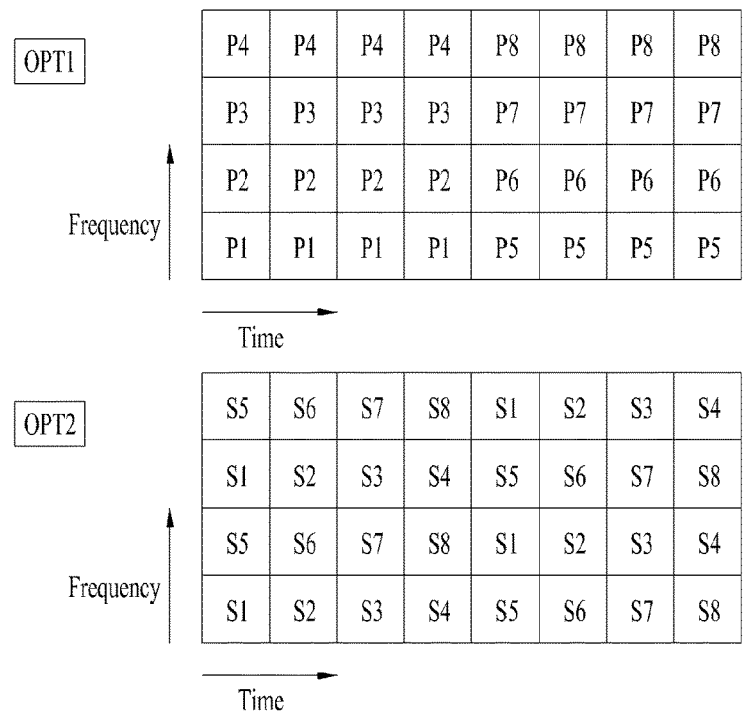
Figure 15:
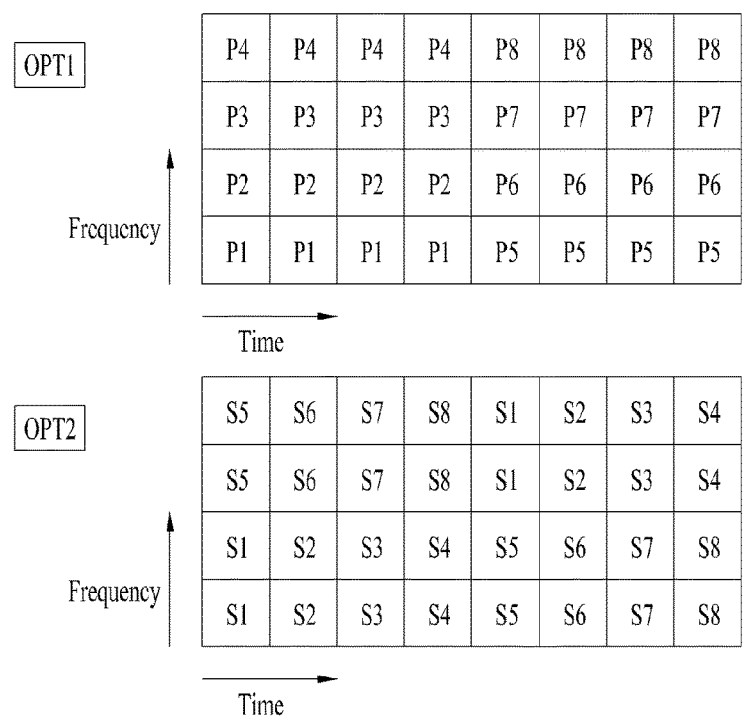

The present invention describes an example of setting resource patterns on the basis of settings A-1 to A-3 with reference to FIGS. 13, 14 and 15.

FIG. 13 is a reference diagram illustrating an embodiment when N=2 and $N_2$=1. In FIG. 13, the number of patterns corresponding to OPT1 is defined as $N_P$, the number of resource units of Pi is defined as $N_{PRU}$, the number of patterns corresponding to OPT2 is defined as $N_S$ and the number of resource units of Si is defined as $N_{SRU}$ (Here, $N_{PRU}>1$ and $N_{SRU}>1$ according to setting A-3).

In FIGS. 13, 14 and 15, patterns Pi consecutively appear on the time axis and $N_{PRU}=N_{SRU}=4$. A description will be given of setting B on the basis of the aforementioned assumption ($N_P*N_{PRU}=N_S*N_{SRU}$)

Setting B: When patterns Pi consecutively appear on the time axis (time-axis-priority mapping), patterns Si are sequentially arranged from frequency #0 on the time axis and then sequentially arranged from frequency #1 on the time axis as the value i increases, as illustrated in FIG. 13. This is repeated until no frequency units remain (frequency axis-priority mapping). After arrangement of S1 to $SN_{SRU}$ is ended, patterns Si are sequentially arranged again in the same manner. The following setting B-1 may satisfy setting A-1 and setting A-2 but does not satisfy setting A-3. For example, FIG. 13 does not satisfy setting A-3. Accordingly, setting B-1 is applied when setting A-3 is satisfied, and setting B-2 is applied when setting A-3 is not satisfied.

Setting B-1: Si arrangement is repeated by $N_{SRU}$ from Si to $SN_{SRU}$ according to setting B-1. A cyclic shift by $(n-1)*N_{PRU}$ may be applied to the n-th repetition, as shown in FIG. 14.

Setting B-2: Single carrier propriety may be lost when setting B-1 is applied, as shown in OPT2 of FIG. 14. In this case, to maintain the single carrier property, the frequency number may be adjusted such that resource units within one pattern consecutively appear along the frequency axis in the same time resource. For example, with respect to pattern S1 in FIG. 14, resource units corresponding to frequency units #1 and #3 on time unit #1 are designed such that the resource units are not consecutive. Accordingly, patterns S2, S3, S4, S5, S6, S7 and S8 are not consecutive on the frequency axis for the same reason. Here, when resource patterns corresponding to frequency #2 and frequency #3 on the frequency axis are exchanged, frequency resource patterns as shown in FIG. 15 are determined and the aforementioned problem can be solved. Accordingly, FIG. 15 satisfies setting A-1 to setting A-3.

Although Pi has been described based on time axis-priority mapping and Si has been described based on frequency axis-priority mapping with respect to setting B, the present invention may be applied to a case in which frequency axis-priority mapping is applied to Pi and time axis-priority mapping is applied to Si.

Furthermore, OPT1 and OPT2 are designed in consideration of both the frequency axis and the time axis in setting B. However, if the quantity of resources increases on the frequency axis, average power may decrease due to peak power of the transmission UE. Accordingly, setting B may be applied only to time after the frequency axis is fixed to 1 in the present invention.

A description will be given of a method of designating a plurality of resource patterns when a transmission UE indicates a resource pattern in an SA pool according to the present invention (setting C). In this case, after design of resource patterns composed of the same quantity of resource units, resource units having various lengths may be used, as shown in FIG. 15.

If OPT1 and OPT2 are designed together, as illustrated in FIG. 15, overlapping resource units may be generated. In this case, only resource units other than overlapping resource units are used for data transmission. For example, if the transmission UE designates P1 and S1 in FIG. 13, the transmission UE uses only 7 resource units. Accordingly, patterns having overlapping resource units may not be designated together in order to simplify resource pattern design.

When setting B of the present invention is used, setting A-3 is satisfied. In setting A-3, as described above, only transmission is performed in a time for which a half-duplex transmission UE transmits data and patterns used in the current resource region are estimated in the reception mode at other times. Accordingly, to support setting A-3, the present invention may apply setting D1 to setting D-3.

Setting D-1: Information about a resource pattern or a UE ID can be used when a sequence of a DM-RS of a transmission UE is generated.

Setting D-2: Information about a pattern or a UE ID can be used when a scrambling sequence of data of the transmission UE is generated.

Setting D-3: Setting D-1 and setting D-2 can be simultaneously applied.

According to the present invention, when selected resource pattern information is defined as $n_p$ and applied to the scrambling sequence of the DM-RS when the DM-RS scrambling sequence is generated as in setting D-1, other transmission UEs may i) check the DM-RS to detect the resource pattern information (i.e. $n_p$) or ii) detect the resource pattern information through the UE ID and information about resource patterns, acquired from an SA pool, in time regions in which the transmission UEs do not perform transmission.

Furthermore, even when a specific parameter (e.g., cyclic shift) of the DM-RS has a 1:1 relationship with a resource pattern and thus a specific UE cannot receive SA of other UEs due to half-duplex, resource patterns used by other UEs may be recognized using only the DM-RS parameter in a time region in which the specific UE does not perform transmission on a designated resource region.

Accordingly, the transmission UE may determine a resource pattern to be used for the next SA transmission in consideration of collision of data transmitted by another UE or current resource traffic state. In the case of a reception UE, interference suppression is possible even if collision occurs because DM-RS parameters are different in overlapping resource units, and thus the possibility that the reception UE receives at least one of a signal of the transmission UE and a signal of the other UE increases.

When selected resource pattern information is defined as $n_p$ and applied to a scrambling sequence of data when the data scrambling sequence is generated as in setting D-2, other transmission UEs may i) check the data to detect the resource pattern information (i.e. $n_p$) or ii) detect the resource pattern information through the UE ID and information about resource patterns, acquired from an SA pool, in time regions in which the transmission UEs do not perform transmission.

Furthermore, even when a specific parameter has a 1:1 relationship with a resource pattern when the data scrambling sequence is generated and thus a specific UE cannot receive SA of other UEs due to half-duplex, resource patterns used by other UEs may be recognized using only the specific parameter when the data scrambling sequence is generated in a time region in which the specific UE does not perform transmission on a designated resource region.

Accordingly, the transmission UE may determine a resource pattern to be used for the next SA transmission in consideration of collision of data transmitted by another UE or current resource traffic state. With respect to the reception UE, interference randomization is possible even if collision occurs because parameters for data scrambling sequence generation are different in overlapping resource units.

Alternatively, setting D-1 and setting D-2 may be simultaneously used like setting D-3.

In addition, the present invention may determine whether to repeatedly use a currently used resource pattern in (the next several) data channel resource pools, which will be used for additional signal transmission, in association with a DM-RS. That is, the number of times of using the currently used resource pattern in the next data channel resource pool may be defined as $N_{slength}$ and used when a DM-RS scrambling sequence is generated. Accordingly, SA pools may be used more efficiently. Furthermore, in an SA pool associated with a data channel resource pool designated to repeatedly use the same pattern, another pattern may be additionally designated. In this case, data may be simultaneously transmitted according to the previous pattern and the newly designated pattern in the data channel resource pool. However, it may be desirable to use resource units in overlapping patterns only once.

Figure 16:
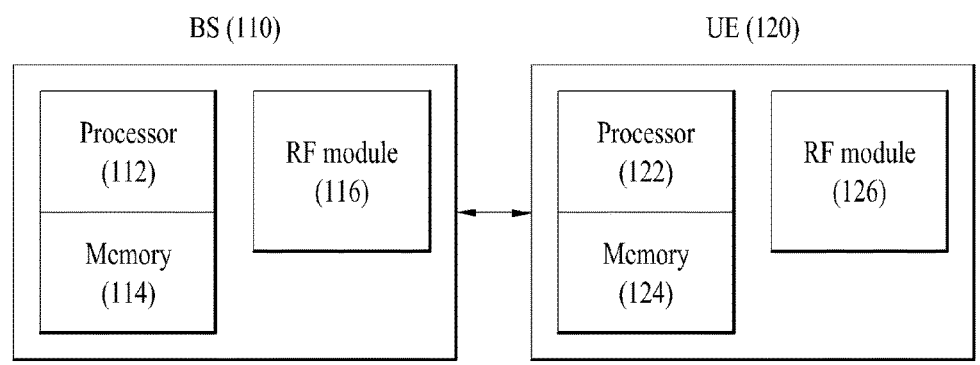
FIG. 16 illustrates a base station and a UE applicable to one embodiment of the present invention.

FIG. 16 illustrates a base station and a user equipment applicable to an embodiment of the present invention.

If a relay node is included in a wireless communication system, a communication in backhaul link is performed between a base station and the relay node and a communication in access link is performed between the relay node and a user equipment. Therefore, the base station or user equipment shown in the drawing can be substituted with the relay node in some cases.

Referring to FIG. 16, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed by the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed by the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNode B (eNB), an access point and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor.

Herein, the memory unit may be located inside or outside of the processor and the memory unit may transmit and receive data to and from the processor by using a wide range of methods that have already been disclosed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a method for reporting channel state information in a wireless communication system and apparatus therefor are described mainly with examples applied to 3GPP LTE system, the present invention can be applied to various kinds of wireless communication systems as well as to the 3GPP LTE system.

What is claimed is:
1. A method of transmitting a device-to-device (D2D) data signal by a first user equipment (UE) in a wireless communication system, the method comprising:
setting a plurality of orthogonal resource patterns,
wherein the plurality of orthogonal resource patterns are related to a resource allocation pattern for the D2D data signal,
wherein each of the plurality of orthogonal resource patterns includes a plurality of resource units; and
transmitting the D2D data signal based on the plurality of resource units for an orthogonal resource pattern among the plurality of orthogonal resource patterns,
wherein the plurality of resource units for each of the plurality of orthogonal resource patterns are overlapped with each other below a number of maximum overlapping number of resource units,
wherein the number of maximum overlapping resource units is informed via signaling of a base station,
wherein the orthogonal resource pattern is determined based on a parameter related to a demodulation reference signal (DM-RS) sequence of a second UE,
wherein the D2D data signal is repeatedly transmitted using a same orthogonal resource pattern, the same orthogonal resource pattern being repeated in the time domain based on a number of repetitions included in DM-RS sequence of the first UE,
wherein the plurality of orthogonal resource patterns are allocated in frequency resources included in a same time resource, and
wherein the plurality of resource units for the each of the plurality of orthogonal resource patterns are consecutively allocated in the frequency resources included in the same time resource.

2. The method according to claim 1, wherein the orthogonal resource pattern is defined based on a time first mapping manner or a frequency first mapping manner.

3. The method according to claim 1, wherein the D2D data signal is transmitted via a resource unit not overlapped among resource units for the orthogonal resource pattern.

4. The method according to claim 1, wherein a scrambling sequence of the D2D data signal is generated based on the orthogonal resource pattern.

5. A first UE for transmitting a device-to-device (D2D) data signal in a wireless communication system, comprising:
a radio frequency (RF) unit including a transceiver; and
a processor, wherein the processor is configured to:
set a plurality of orthogonal resource patterns, wherein the plurality of orthogonal resource patterns are related to a resource allocation pattern for the D2D data signal,
wherein each of the plurality of orthogonal resource patterns includes a plurality of resource units, and
transmit the D2D data signal based on the plurality of resource units for an orthogonal resource pattern among the plurality of orthogonal resource patterns,
wherein the plurality of resource units for each of the plurality of orthogonal resource patterns are overlapped with each other below a number of maximum overlapping resource units,
wherein the number of maximum overlapping resource units is informed via signaling of a base station,
wherein the orthogonal resource pattern is determined based on a parameter related to a demodulation reference signal (DM-RS) sequence of a second UE,
wherein the D2D data signal is repeatedly transmitted using a same orthogonal resource pattern, the same orthogonal resource pattern being repeated in the time domain based on a number of repetitions included in DM-RS sequence of the first UE,
wherein the plurality of orthogonal resource patterns are allocated in frequency resources included in a same time resource, and
wherein the plurality of resource units for the each of the plurality of orthogonal resource patterns are consecutively allocated in the frequency resources included in the same time resource.

* * * * *